A. B. LANDIS.
BOLT THREADING MACHINE.
APPLICATION FILED MAR. 11, 1909.
1,017,878.
Patented Feb. 20, 1912.
6 SHEETS—SHEET 1.
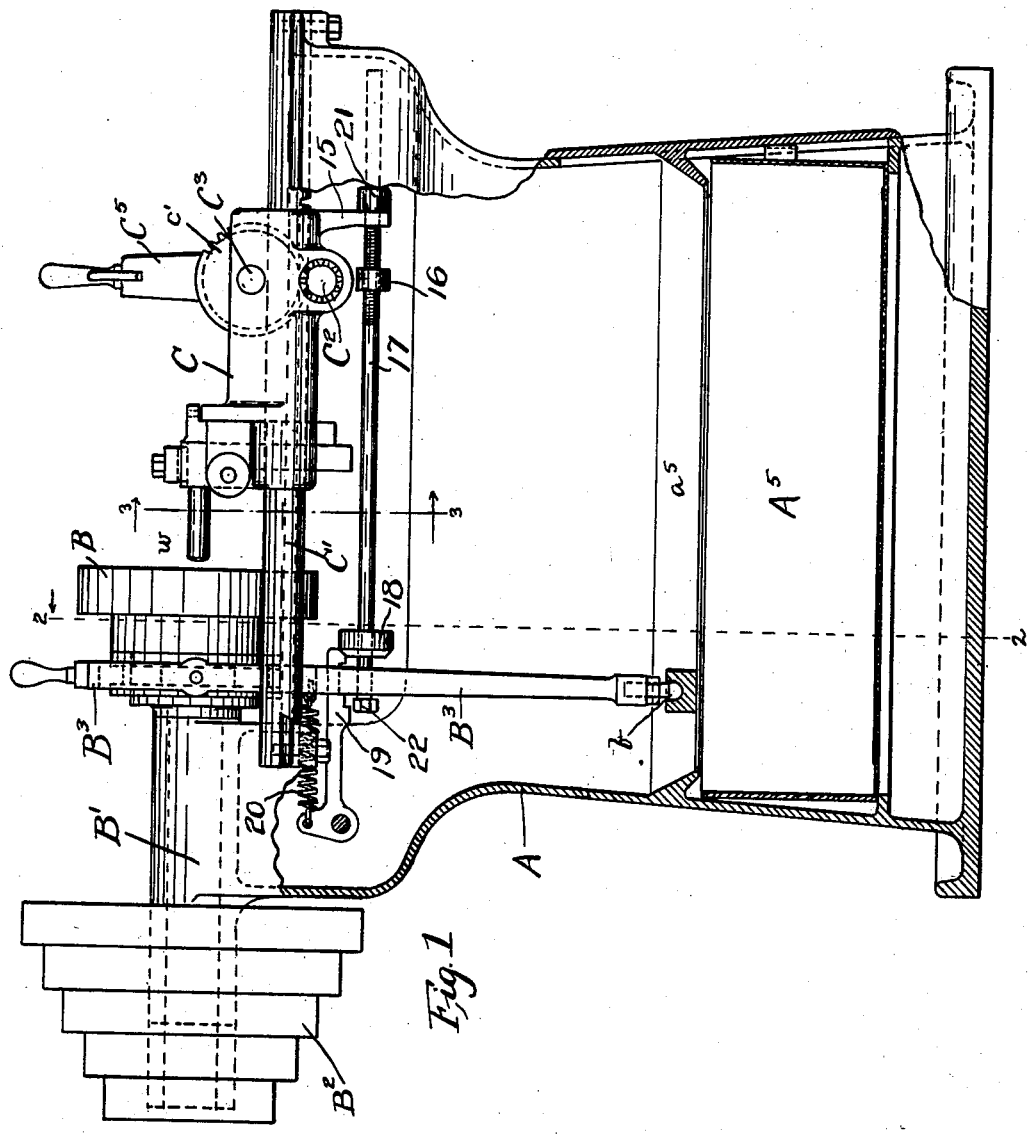
WITNESSES:
C. K. Reichenbach
L. A. Price.
INVENTOR.
Abraham B. Landis,
BY E. W. Bradford
ATTORNEY.

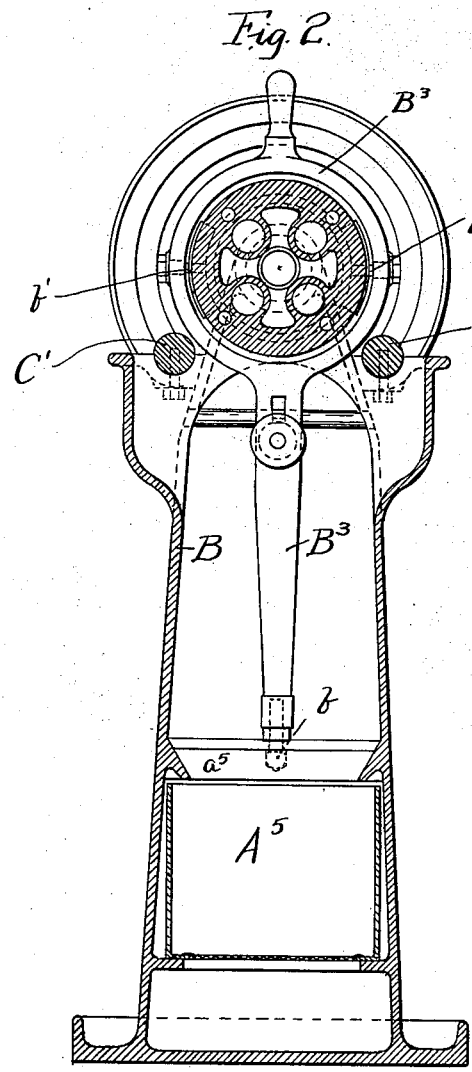

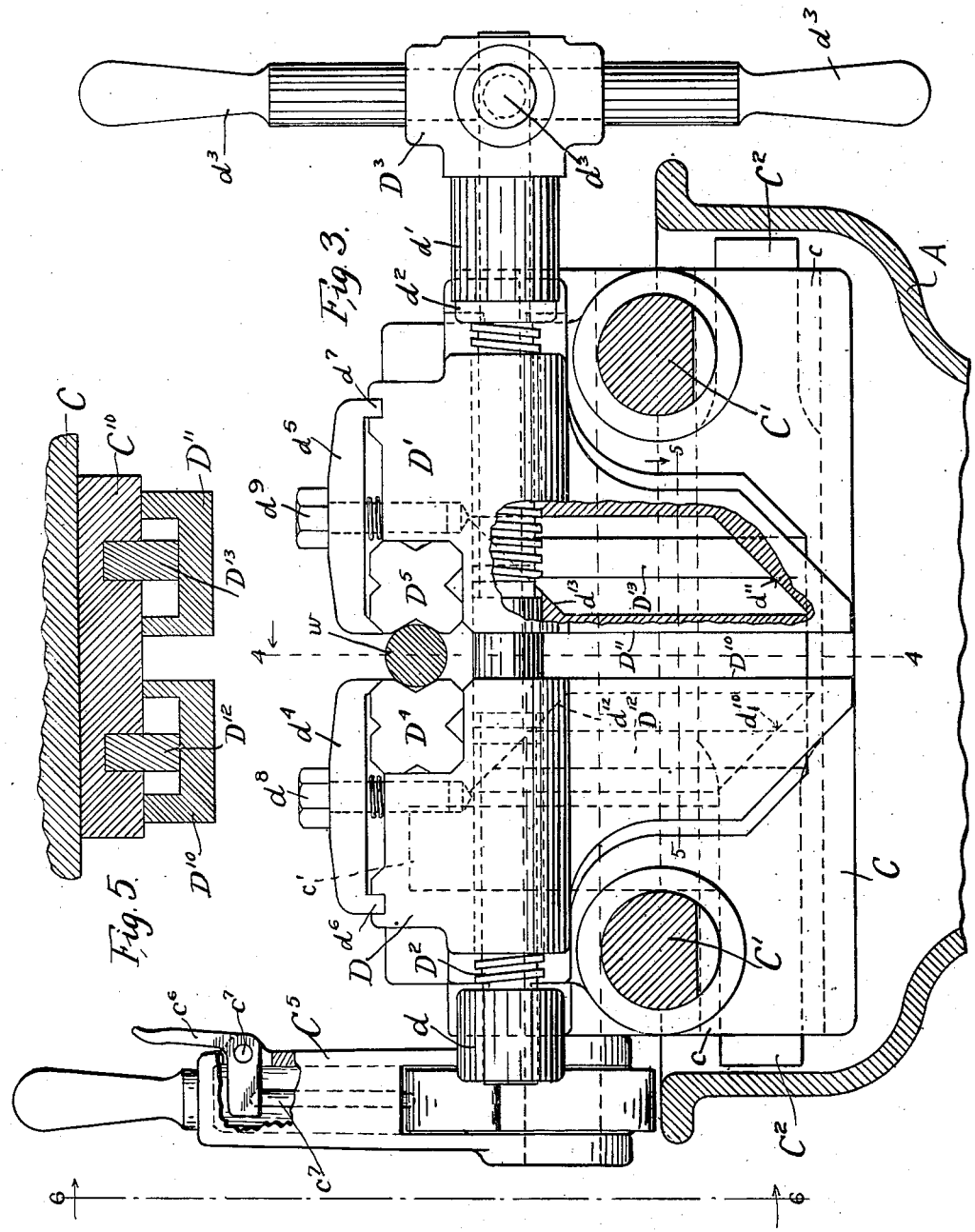

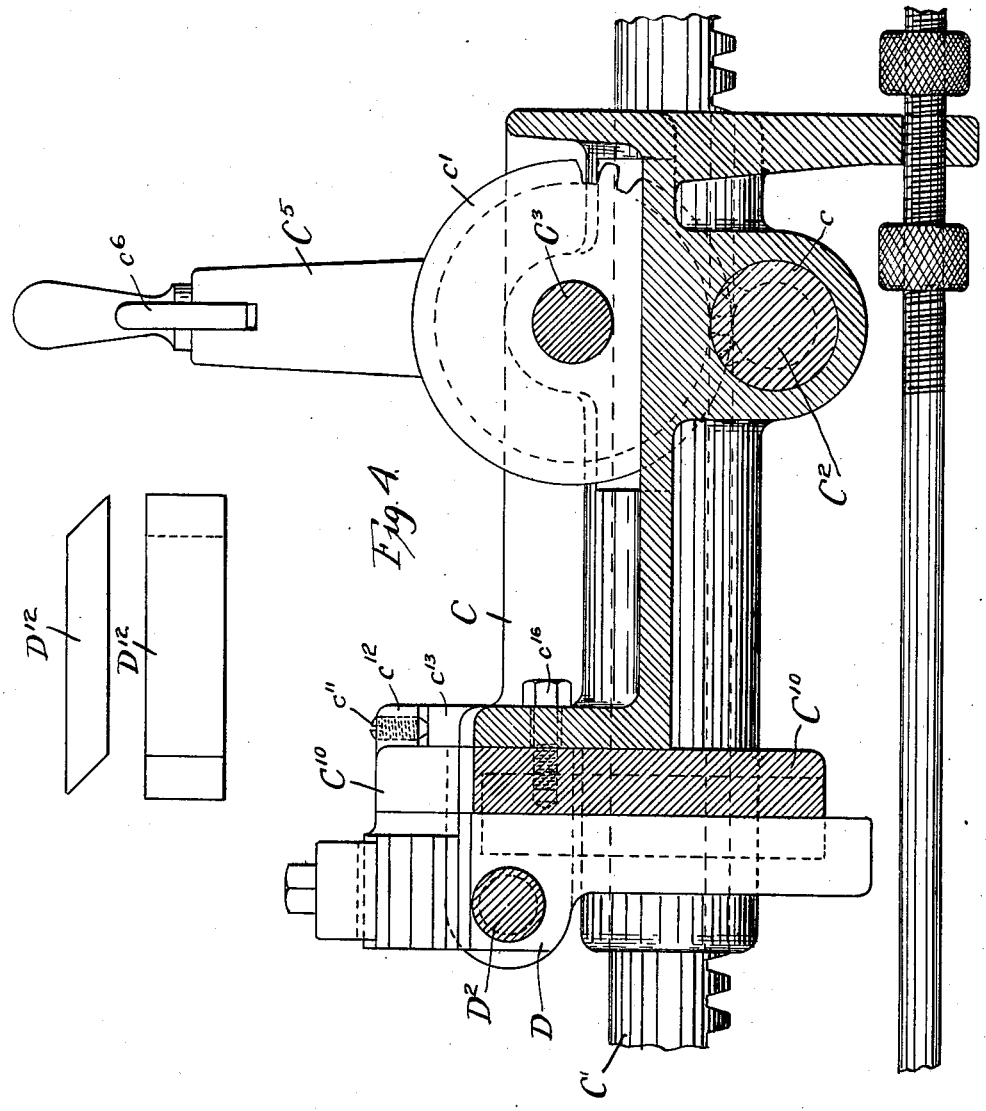

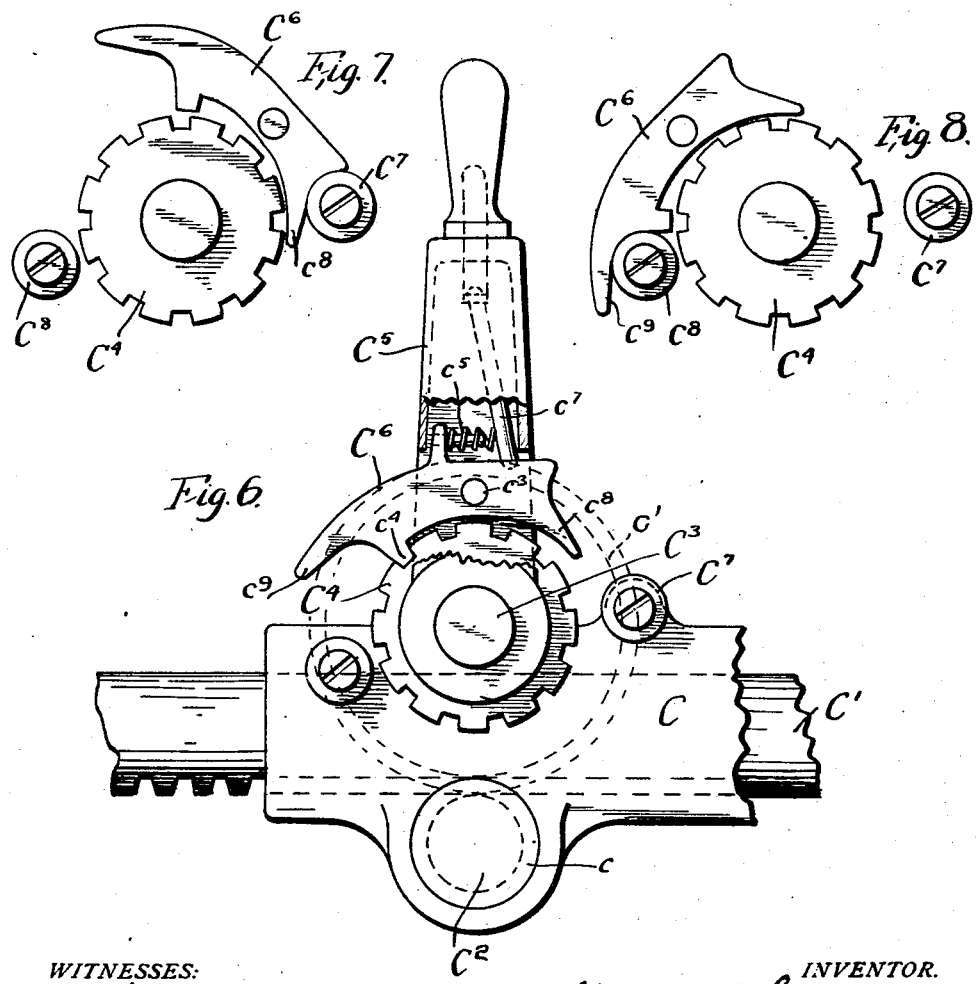

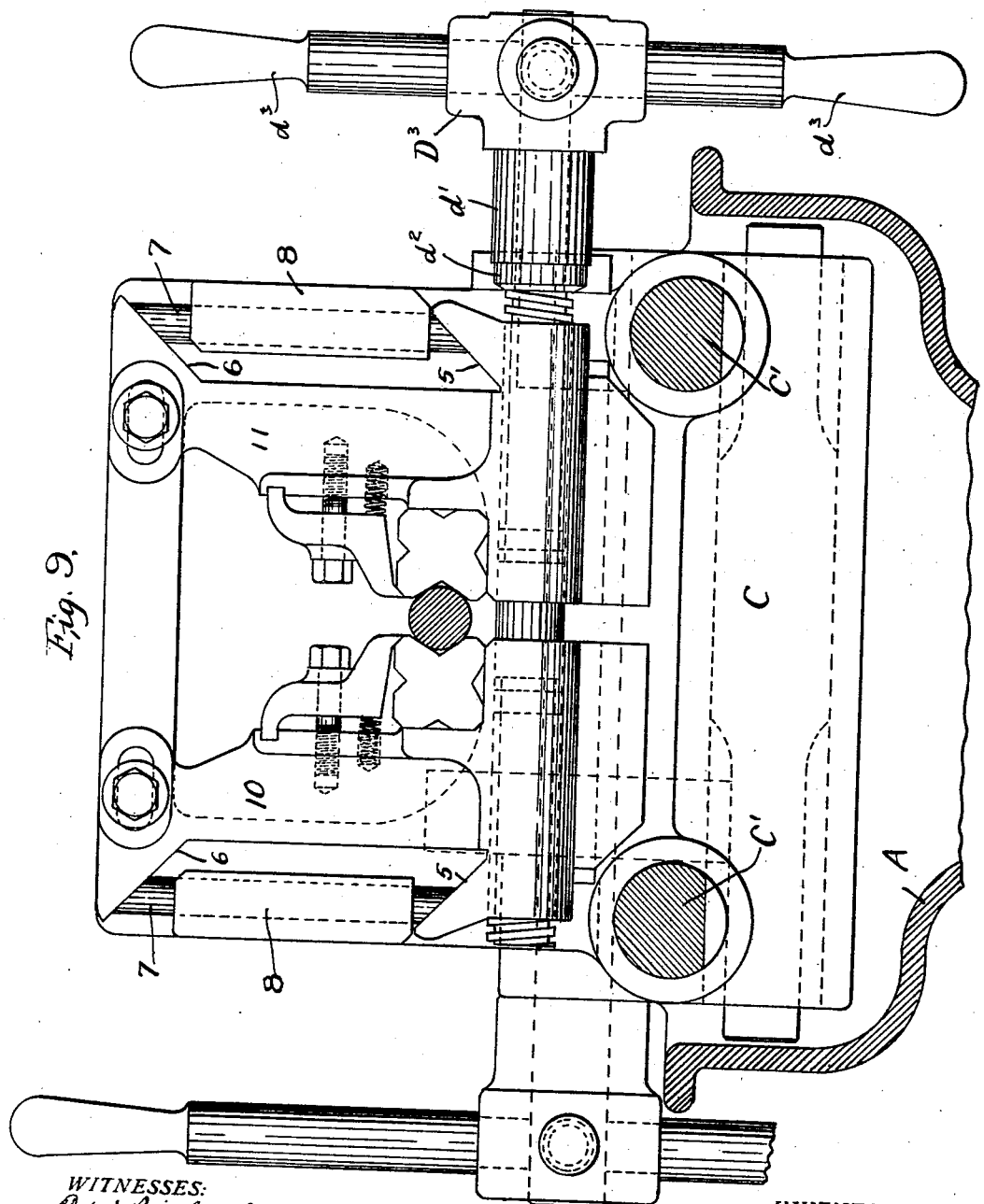

UNITED STATES PATENT OFFICE.

ABRAHAM B. LANDIS, OF WAYNESBORO, PENNSYLVANIA.

BOLT-THREADING MACHINE.

1,017,878.  Specification of Letters Patent.  Patented Feb. 20, 1912.

Application filed March 11, 1909. Serial No. 482,800.

*To all whom it may concern:*

Be it known that I, ABRAHAM B. LANDIS, a citizen of the United States, residing at Waynesboro, in the county of Franklin and State of Pennsylvania, have invented certain new and useful Improvements in Bolt-Threading Machines, of which the following is a specification.

My said invention consists in various improvements in the details of construction of bolt-threading machines, whereby a machine of this character is provided which will be accurate in its operation, simple and comparatively inexpensive in construction, embodying mechanism for maintaining parallelism of the holding jaws without strain upon the guides and operating screw, and other improvements of advantage, all as will be hereinafter more fully described and claimed.

Referring to the accompanying drawings which are made a part hereof and on which similar reference characters indicate similar parts, Figure 1 is a side elevation of a bolt-threading machine embodying my improvements, the bed or frame thereof being shown in section, Fig. 2 a cross section on the dotted line 2—2 in Fig. 1, Fig. 3 a detail cross section on the dotted line 3—3 in Fig. 1, Fig. 4 a cross section on the dotted line 4—4 in Fig. 3, Fig. 5 a detail section on the dotted line 5—5 in Fig. 3, Fig. 6 a detail view looking in the direction indicated by the arrows from the dotted line 6—6 in Fig. 3, Figs. 7 and 8 detail views illustrating the position of the parts shown in Fig. 6 at different points in the movement of the carriage, and Fig. 9 a view similar to Fig. 3 illustrating a modified construction.

In said drawings the portions marked A represent the bed or frame of the machine, B the cutter-head, C the carriage, and D, D' the adjustable blocks of the work holding clamp or vise.

The bed or frame A may be of any appropriate construction provided with ways on the top for the carriage and having bearings for the shaft carrying the cutter-head, and other parts of the mechanism.

The cutter-head B is preferably of the construction shown in my application No. 458,381, filed October 19, 1908, or may be of any construction found suitable. It is mounted on a shaft B' in bearings provided therefor on the top of bed A, on which is mounted a cone driving pulley B² which may be connected by a belt to any suitable power shaft. A lever B³ is connected to the cutter-head for opening and closing the same, as will be presently described, the lower end being pivoted at $b$ in a suitable seat provided in the frame A. Said lever B³ at its upper end surrounds said cutter-head and is connected to the shifting ring thereof by pivots $b'$ on each side.

The carriage C is mounted to slide upon ways C' mounted on the top of bed A, said ways consisting preferably of round bars mounted at their ends in suitable supports inside of the outer edges of said bed. Said bars are formed with racks on their under sides for a distance to provide for the travel of the carriage. A transverse shaft C² is journaled in said carriage and provided with pinions $c$ at each end the teeth of which mesh with the teeth of said racks on the under side of said tracks C'. A second transverse shaft C³ is journaled in said carriage above said tracks and provided near one end with a gear wheel $c'$ the teeth of which also engage the teeth of the pinion on one end of shaft C². Said shaft C³ is also provided with a notched wheel C⁴ and has a lever C⁵ mounted loosely thereon and formed bifurcated to straddle said wheel C⁴. A pivoted pawl C⁶ is mounted on a pivot $c³$ in said lever with a point $c⁴$ adapted to engage with the notches in said wheel C⁴. A spring $c⁵$ serves to hold said point normally in engagement with said wheel and a finger lever $c⁶$, pivoted at $c⁷$ near the upper end of said lever C⁵ and connected to the pawl C⁶ by a push pin $c⁷$, is provided for throwing said pawl out of engagement. One end of said pawl C⁶ is formed with a cam point $c⁸$ adapted to engage under a roller C⁷ on the carriage at one extreme of the movement of the lever C⁵, to automatically disengage pawl C⁶, as shown in Fig. 7, while its other end is formed with another cam face $c⁹$ adapted to engage with a roller C⁸ and disengage the pawl from the wheel C⁴ at the other extreme of the movement of the lever C⁵, as will be presently described.

The clamping-jaw carrying-blocks D, D' are mounted upon a transverse rod D² which is journaled at its ends in bearings $d$, $d'$ on the carriage C. Said rod is screw-threaded being formed with a right-hand thread on one side of its center and a left-hand thread on the other side, the central portion and its extreme ends being smooth. The blocks D and D' are mounted on said screw-threaded portions by means of correspondingly screw-threaded perforations. A hand wheel comprising a hub $D^3$ with radial arms $d^3$ is mounted upon one end of said rod for operating it. Said rod is held from longitudinal movement by said hub $D^3$ on one side of the bearing $d'$ and a collar $d^2$ secured to said rod on the other side of said bearing. In the upper adjacent corners of said blocks D and D' are formed rectangular recesses in which are serrated clamping jaws $D^4$ and $D^5$, respectively, said jaws being formed with angular notches in their adjacent faces, a notch of different size being formed in each face to adapt said jaws for holding work of different sizes. Said jaws are formed with tapered corners and are held in position by means of clamps $d^4$ and $d^5$, respectively, each being formed at one end with a longitudinal flange, $d^6$ and $d^7$, to engage a notch in the upper face of the respective blocks and with a flange with a tapered face projecting downwardly from their adjacent ends adapted to rest upon the tapered corners of said jaws. Clamping screws $d^8$ and $d^9$, respectively, projecting into screw-threaded perforations in said blocks, serve as a means for clamping said jaws in position in said recesses. Coiled springs $d^{20}$ and $d^{21}$, respectively, are preferably mounted around said screws $d^8$ and $d^9$ to lift said clamps when the screws are backed. Each of said blocks is formed with a downwardly depending arm or portion, $D^{10}$ and $D^{11}$, respectively each having a bottom flange with an internal tapered face, $d^{10}$ and $d^{11}$, respectively, and a correspondingly tapered flange at the upper end, $d^{12}$ and $d^{13}$ respectively. A sliding bar, $D^{12}$ and $D^{13}$, respectively, with ends tapered to correspond with the taper of the top and bottom of said arms $D^{10}$ and $D^{11}$ are mounted and adapted to slide in vertical grooves in a part $C^{10}$ secured rigidly to the carriage C with one edge projecting into a recess formed in said arms $D^{10}$ and $D^{11}$, respectively, and thus serve to hold said blocks D, D' in a parallel position at all times. To illustrate: It will be seen by an examination of Figs. 3, 4 and 5 that as the screw-rod $D^2$ is turned by means of the hand-wheel $d^3$ to clamp the work $w$ between the jaws $D^4$ and $D^5$ the strain will tend to tilt the tops of blocks D, D' away from each other and toward each other at their lower edges, thus causing said blocks to bind upon the threads of rod $D^2$ and their engaging threads, or perhaps break said threads under the great strain. By the arrangement described said strain instead of being thrown upon the threads of the screw-rod and blocks is thrown against the bars $D^{12}$ and $D^{13}$ which are rigid in the plate $C^{10}$ on the carriage C and thus serve to hold said blocks perfectly parallel. As the blocks D and D' are operated toward and from each other by means of turning the right and left hand screw $D^2$ said bars $D^{12}$ and $D^{13}$ will slide up or down in their grooves in the part $C^{10}$, being operated by their contact with the angle or cam faces at the top and bottom of the arms $D^{10}$ and $D^{11}$ of said blocks. Part $C^{10}$ which is secured to the carriage C by bolts $c^{16}$ is arranged with two lugs $c^{12}$ one on each side of the carriage. A screw $c^{11}$ is inserted in a screw-threaded perforation in said lugs the lower end contacting with the flange $c^{13}$ of carriage C. By this screw the plate $C^{10}$ can be adjusted to bring the work held in the jaws of the carriage vertically central with the screw cutting head, the holes in the flange $c^{13}$ of the carriage C being larger than the bolt $c^{16}$ to permit this adjustment and also allow of adjustment of the same sidewise with reference to the screw cutting head. By this means correct alinement of the work with the screw cutting head can always be maintained regardless of any wear of the shaft carrying the screw cutting head or of the carriage upon its tracks.

In Fig. 9 I have shown a modification wherein the balancing of the strain to secure a fixed parallel relation between the blocks carrying the clamping jaws is secured, wherein the blocks are formed with tapered faces 5 and 6 on appropriate parts near the top and lower side of upwardly extending parts. Said faces engage with correspondingly tapered ends of a pin or bar 7 mounted at each side to slide in a suitable perforation in a part 8 secured to the carriage. The operation will be similar to that just described for the principal form, the arms 10 and 11 serve to hold the blocks of which they are a part parallel by reason of being held in a fixed vertical position by the contact of the tapered faces 5 and 6 with the tapered ends of the sliding pins 7.

The general operation of the machine is as follows: The work W being clamped between the work holding jaws $D^4$ and $D^5$ as shown in Fig. 3 and just described and the parts being in the position shown in Fig. 1, the carriage C is moved forward by means of the lever $C^5$, which operates through the toothed wheel $c'$ and pinion $c$ to turn the shaft $C^2$ and through the engagement between the said pinion and the racks on the under side of the tracks $C'$ move said carriage forward until the end of the work W engages with the die on the cutter-head B. The operation of the die will then continue the forward movement of the carriage, pulling the work into it until a depending arm 15 on the carriage D strikes a stop 16 on a rod 17, which is adjusted to the proper position by means of the screw-threaded connection between said stop and rod, when said rod 17 will be forced forward and a collar 18 near its front end with a cam-shaped face will operate to raise a latch 19 out of engagement with the lever B³ and spring 20 draws said lever backward to operate the mechanism for opening the die of the cutter-head B and release the work. When this has been done the operator by means of said lever C⁵ draws the carriage back until the work is free from the cutter-head and the arm 15 contacts with another adjustable stop 21 on the rear end of rod 17 drawing said rod rearward until its head 22 contacts with rear side of said lever B³ and closes the die, the spring 20 serving to throw the latch 19 into engagement with said lever to secure said die closed. The work W is then removed by expanding the holding jaws D, D' through the medium of the screw-rod D², another blank put in place and the operation repeated. When it is desired to move the carriage a greater distance than an easy swing of the lever C⁵ in either direction, the pawl C⁶ and ratchet wheel C⁴ are utilized through the medium of the finger lever $c^6$ by which the pawl can be disengaged from said notched wheel and the lever C⁵ swung freely in either direction the distance desired without moving the shaft C³ and the wheel C' thereon, when, by releasing said finger lever, the spring $c^5$ will operate to reëngage said pawl C⁶ and connect said lever C⁵ with the shaft C³. When the movement of the carriage C, toward or away from the screw cutting head is for such a distance that the lever C⁵ would pass to a position approximately 45 degrees either way, the cam ends $c^8$ or $c^9$ will contact with the rollers C⁷ or C⁸ and automatically release said lever from operative connection with shaft C³, as will be readily understood. Said rollers also serve as a stop on which the lever will rest.

By this arrangement the work holding carriage and operating mechanism is mounted entirely within the frame A, the top of which projects beyond the ways or tracks C' and is formed to receive and guide the water, oil and cuttings to inside said bed and deposit them in a receptacle A⁵ mounted near the bottom of said bed for the purpose. An overhanging flange $a^5$ is provided above the top of said receptacle A⁵ to guide said substance into said receptacle. A very complete apparatus is thus provided and one which will make but little dirt in operation and will do its work in a perfect manner.

Having thus fully described my said invention, what I claim as new and desire to secure by Letters Patent, is:—

1. In a bolt threading machine, the combination of a frame, the cutter-head, the work carriage mounted on longitudinal tracks arranged inside the top of said frame, said tracks formed with racks on one side, pinions on a shaft carried by said carriage engaging with said racks, means for operating said pinions to slide said carriage back and forth on said tracks, the work holding clamp on said carriage, and means for operating said clamp, substantially as set forth.

2. In a bolt threading machine, the combination, of a frame, a cutter-head, a work carriage, means for sliding said carriage back and forth, and a work-holding clamp on said carriage comprising transversely adjustable blocks carrying clamping jaws in adjacent faces thereof, each of said blocks being formed with a part extending to one side of the adjusting screw and parallel with each other and formed with tapered faces adapted to contact with sliding parallel bars mounted in grooves in a rigid part and formed with correspondingly tapered ends, said bars and said adjusting screw, substantially as set forth.

3. A bolt threading machine, comprising a work-holding clamp consisting of blocks mounted on an adjusting screw, said screw, each block carrying a jaw of the clamp and formed with a projecting part extending to one side of said adjusting screw and formed with tapered faces, bars mounted to slide in grooves in a fixed part of the carriage adjacent to said parts and formed with tapered ends adapted to engage the tapered faces of said parts and hold them in true parallel relation, substantially as set forth.

4. A bolt threading machine, comprising a work-holding clamp mounted on the carriage and consisting of blocks mounted on a right and left hand screw for adjusting them toward and from each other, each carrying a jaw of the clamp, and each formed with a part extending to one side of said screw and formed with parallel tapered faces at opposite ends, said screw, a sliding bar with correspondingly tapered ends adapted to engage with the tapered faces of each of said parts mounted to slide in rigid bearings in a part on the carriage, and said bearings substantially as set forth.

5. A work-holding clamp for a bolt threading machine comprising jaw carrying blocks, means for adjusting them to clamp and release the work, each of said blocks being formed with projecting parts with tapered faces, sliding parts with tapered faces engaging therewith and mounted in rigid bearings, and said rigid bearings, whereby said blocks are held parallel and the strain is received by said sliding parts, substantially as set forth.

6. A work-holding clamp for the carriage of a thread-cutting machine comprising adjustable jaws formed with tapered faces engaging with the tapered ends of a part mounted to slide transversely in a bearing in a fixed adjacent part of the carriage, said sliding part, and said fixed adjacent part, substantially as set forth.

7. A work-holding clamp comprising adjustable jaws with tapered faces engaging tapered faces of parts mounted to slide transversely in bearings in rigid adjacent parts, said sliding parts, and said rigid adjacent parts, substantially as set forth.

8. A work clamp for a thread-cutting machine, comprising a supporting frame, blocks carrying jaws mounted on an adjusting screw, each of said blocks having a part projecting to one side of the screw and formed with tapered parallel faces at opposite ends, a bar mounted to slide in a groove in a fixed part of the carriage adjacent thereto and formed with correspondingly tapered ends which engage the tapered faces of said blocks and hold them in fixed parallel relation, while permitting their adjustment toward and from each other, said adjusting screw, said bar, and said fixed part, substantially as set forth.

9. In a machine of the character described, the combination, of the cutter-head, the work carriage, the work clamp on said carriage, said carriage being mounted on tracks by a rack and pinion connection for operating it, said tracks, said rack and pinion, a lever for operating the pinion connected to the operating shaft by a pawl and ratchet connection, and means for throwing the pawl out of engagement with the ratchet automatically at each end of the movement, substantially as set forth.

10. In a machine of the character described, the combination, of the carriage, means for operating said carriage comprising a rack and pinion connection between said carriage and the track, said track, a lever for operating the pinion connected to the shaft by a pawl and ratchet, said pawl and ratchet, said pawl being formed with a cam projection at each end adapted to contact with a trip to disengage the pawl at the limit of the movement of said lever, substantially as set forth.

11. The combination of a frame, a work-holding carriage, means for holding the work, tracks for said carriage, a rack, a pinion engaging said rack, a gear engaging said pinion, a shaft on which said gear is mounted, a ratchet wheel upon said shaft, a lever having a pawl engaging said ratchet wheel, stops by which said pawl is automatically disengaged from said ratchet wheel at the extreme position of said lever, which stops form a rest for said lever, all substantially as set forth.

12. In a work-holding clamp for the carriage of a thread-cutting machine, the combination of blocks arranged to simultaneously advance toward and recede from each other, clamping jaws seated in said blocks having beveled corners, and clamps arranged to bear on said corners, substantially as set forth.

13. In a work-holding clamp, the combination of blocks arranged to simultaneously advance toward and recede from each other, a clamping jaw seated in a recess in each of said blocks, beveled corners on said jaws, clamps bearing on said corners having a tongue engaging a groove in said blocks, substantially as set forth.

14. In a work holding clamp the combination of blocks arranged to advance toward and recede from each other, clamping jaws seated in recesses in said blocks, and clamps engaging beveled corners of said jaws, whereby said jaws are forced diagonally into the corners of said recess, substantially as set forth.

15. In a work-holding clamp the combination of blocks arranged to advance toward and recede from each other, clamping jaws seated in recesses in said blocks, clamps engaging beveled corners of said jaws whereby they are diagonally forced into the corners of said recesses, one end of said clamp bearing on the corner of said jaw and the other end bearing in a groove in said block, substantially as set forth.

16. In a work-holding clamp the combination of blocks arranged to move toward each other, clamping jaws seated in recesses in said block, clamps engaging the corners of said jaws, one end of said clamp bearing on the corner of said jaws and the other end bearing in a groove in said block, a screw for forcing said clamp upon said block, and a spring for raising it, substantially as set forth.

In witness whereof, I, have hereunto set my hand and seal at Waynesboro, Pa. this 20th day of February, A. D. nineteen hundred and nine.

ABRAHAM B. LANDIS. [L. S.]

Witnesses:
ALF. N. RUSSELL,
GEO. H. RUSSELL.